Patented Oct. 28, 1947

2,429,932

UNITED STATES PATENT OFFICE 2,429,932

FUEL VALVE MECHANISM

Hewitt A. Gehres, Mount Vernon, Ohio, assignor to Cooper-Bessemer Corporation, Mount Vernon, Ohio, a corporation of Ohio Application August 18, 1945, Serial No. 611,346

4 Claims. (Cl. 123—90)

The invention relates to gas engines of the general type shown in the patent to Boyer No. 2,375,071, issued May 1, 1945, entitled "Supercharger for four-cycle gas fueled engines," wherein gaseous fuel and air are introduced into the combustion space to secure supercharging, a stream of scavenging air unmixed with fuel being introduced before the exhaust valve has closed, the mixture of fuel and air being introduced under relatively low pressure during the early stages of the compression stroke and being followed by a final blast of air alone which clears the inlet passages of residual gas in such manner that when scavenging air is next admitted as above described, no appreciable amount of fuel will pass in with the air during the scavenging period or until after the exhaust valve has closed and the fuel controlling valve mechanism has again opened to admit fuel during the compression stroke.

The invention aims primarily to provide an inlet fuel valve mechanism which, with a minimum of complication or additional parts, will provide for the admission and control of the fuel supplied, in proper relation to the admission of the air for scavenging and combustion. Further objects and advantages of the invention will be in part obvious and in part specifically referred to in the description hereinafter contained, which, taken in conjunction with the accompanying drawings, discloses the invention as carried out by a valve mechanism of preferred construction and mode of operation; the disclosure however should be considered as merely illustrative of the invention in its broader aspects. In the drawings—

Figure 1:
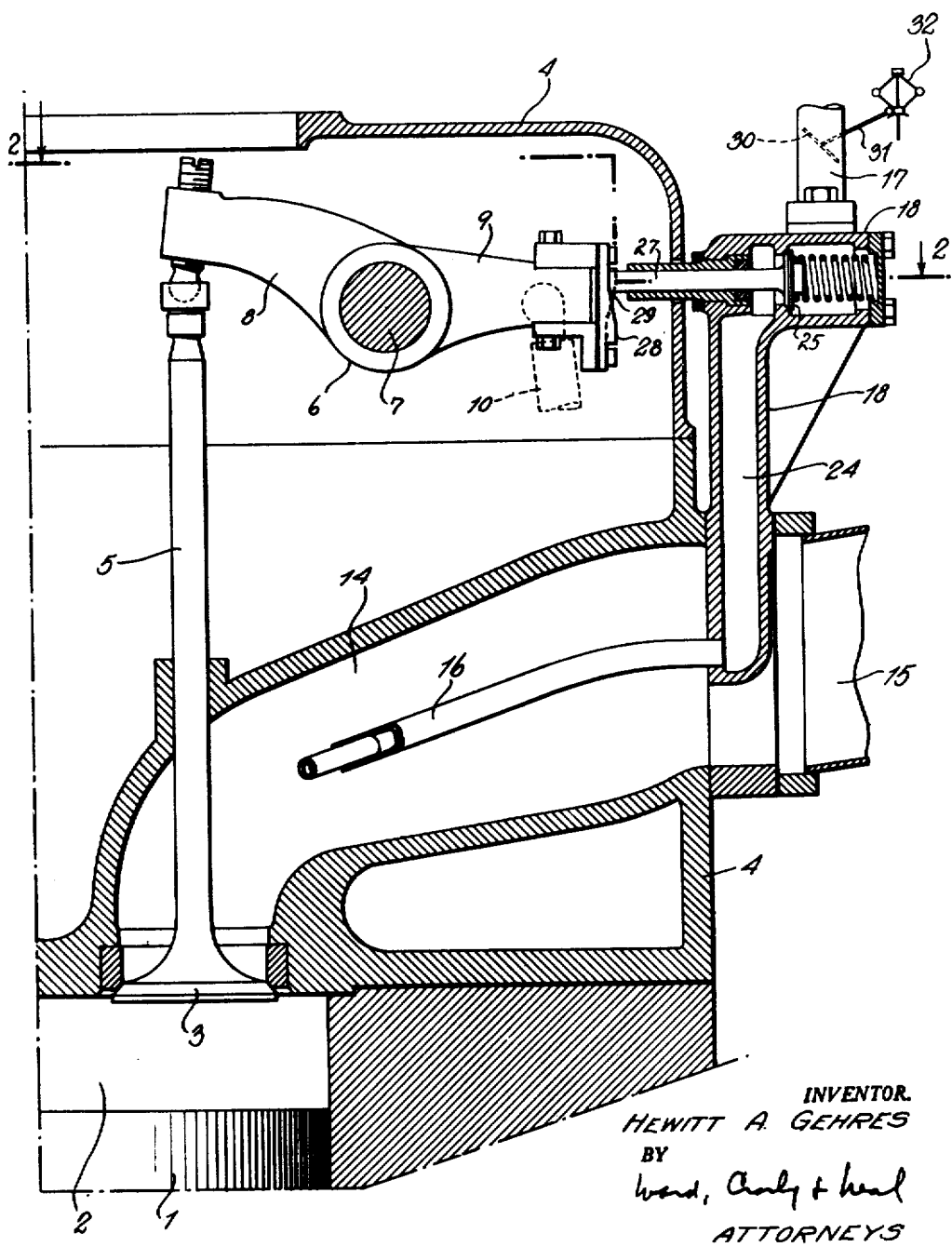
Fig. 1 is an end elevation, largely in section, showing an inlet valve at the head end of an internal combustion engine, and equipped with a valve mechanism constructed to operate in accordance with the invention.
Figure 2:
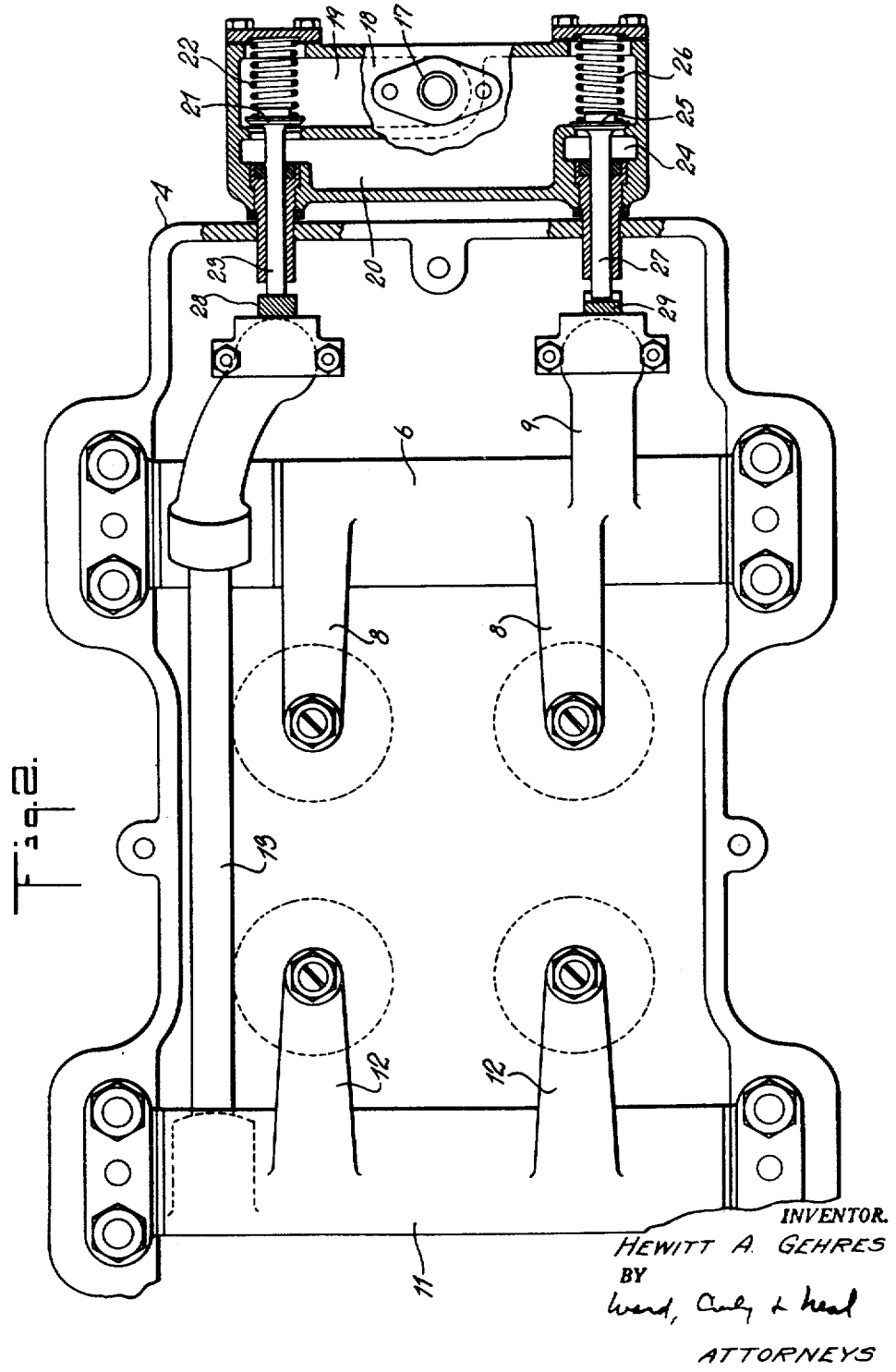
Fig. 2 is a section on the broken line 2—2 of Fig. 1 looking in the direction of the arrows.
Figure 3:
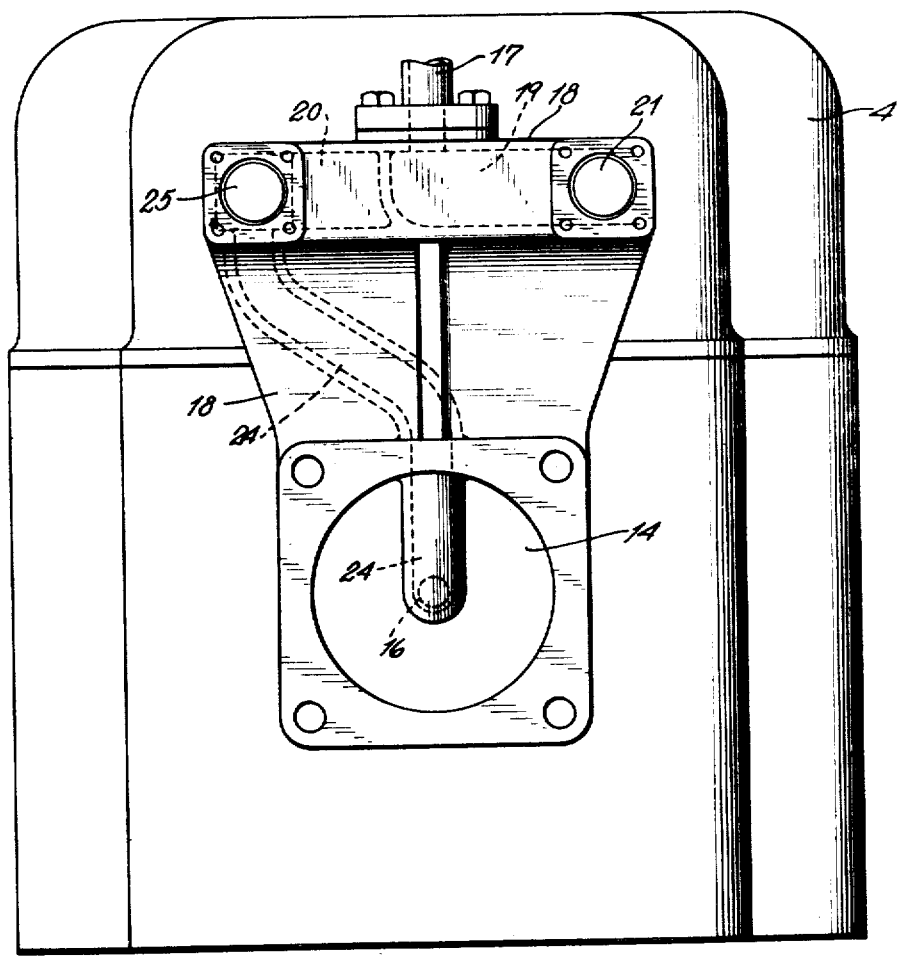
Fig. 3 is a side elevation, looking from the right of Fig. 1 and showing primarily certain fuel and air conducting chambers and conduits and associated auxiliary valve mechanisms which appear at the right of Fig. 1.

The invention is illustrated in Fig. 1 as applied to an engine cylinder 1 having a combustion chamber 2, and a main inlet valve 3 of the poppet type which is mounted in the housing 4 at the cylinder head. The stem 5 of valve 3 is operated by a rocker member 6 shown at the upper part of Fig. 1 as mounted for angular movement about a stationary shaft 7. One arm 8 on rocker member 6 engages the valve stem 5 and another arm 9 on rocker member 6 is engaged by a thrust rod 10 to periodically open the valve in known manner. As indicated in Fig. 2, the particular illustrated form of engine has two of the inlet valves above mentioned and two of the arms 8, one for each inlet valve. As indicated in Fig. 2 the particular engine illustrated also has two exhaust valves (not shown in detail) which may be understood as of known construction similar to inlet valves 3, and operated by the rocker member 11 shown at the left of Fig. 2, which is similar to the inlet valve rocker member 6. As shown in Fig. 2 the exhaust valve operating rocker member 11 has arms 12 similar to the arms 8 above described and serving the respective exhaust valves, and said rocker member 11 is also shown in Fig. 2 as provided with an arm 13 similar in function to the arm 9 previously described, and similarly operated to open and close the exhaust valves in known manner. The following description will be confined to the invention as applied to one inlet valve and one exhaust valve, since the invention applies as well to engines having but one main inlet valve and but one exhaust valve.

In the desired cycle of operation, scavenging air substantially unmixed with fuel is first admitted through valve 3 into the combustion space 2 for scavenging purposes, toward the end of the exhaust stroke and while the exhaust valve is still open. This timing of the admission of scavenging air is secured by the proper timing of the thrust rod 10, the air passing in through an air supply conduit 14 (Fig. 1) in the housing 4 at the head end of the cylinder, and air at a relatively low pressure (of the order of 15 to 30 lbs. per sq. in.) being supplied to conduit 14 from a suitable source through a pipe 15 indicated at the right of Fig. 1. At all times when the main inlet valve 3 is open, the air may thus pass into the cylinder.

After the exhaust valve has closed, and after the inlet valve 3 has been opened, gaseous fuel is passed through valve 3 into the combustion space 2 in admixture with air in proper proportions for combustion purposes. For this purpose a gaseous fuel supply conduit 16 is shown in Fig. 1 as being located within and delivering into the air supply conduit 14 as above described. Fuel passes into this conduit 16 through certain intermediate connections and controlling devices which will be later described in greater detail, but it should be stated at this point that the supply of gas through conduit 16 is cut off before the main inlet valve 3 closes, in order that during the cylinder charging stage there will be a final blast of air through conduit 14 which will clear said conduit of residual gas. Valve 3 then closes after the cylinder has been supercharged with the fuel and air mixture, the introduction of the combustible mixture being completed fairly early in the compression stroke, so that the air and gas need be supplied only at moderate pressure. Then when main inlet valve 3 is opened during the next scavenging stage, there will be no residual fuel remaining in conduit 14, and the cylinder may be charged with pure air without waste of fuel by passage out through the exhaust pipe along with the scavenging air.

In accordance with the present invention in its preferred and complete form, I provide in conjunction with the inlet valve 3, certain auxiliary valves controlling the flow of fuel to the main inlet valve, these auxiliary valves being controlled respectively according to the positions of the main inlet and exhaust valves, in such manner that the auxiliary exhaust controlled valve is open only when the main exhaust valve is closed, and the auxiliary inlet controlled valve is open only when the main inlet valve 3 is open. Thus, because of this auxiliary fuel controlling mechanism, fuel can flow into the conduit 14 from fuel pipe 16 only when the exhaust valve is closed and the main inlet valve 3 open, the auxiliary valves acting to confine the inflow of fuel to the above period in the cycle to insure that fuel will be supplied at the proper time for introduction into the cylinder through main inlet valve 3 in admixture with the proper amount of air for combustion, and also to insure that no fuel will flow into the cylinder while the exhaust valve is open and air is being introduced to aid in scavenging. The auxiliary fuel valve controlled by the main inlet valve is so timed that it will be closed before the main inlet valve closes, so as to provide a final blast of air through conduit 14 as above described, which clears the conduit of residual fuel, before the main inlet valve is next opened to admit air unmixed with fuel for scavenging purposes.

These auxiliary fuel controlling valves may be operated in accordance with the invention from the usual main inlet and exhaust valve operating levers or rocker arms without requiring additional shafts, linkages or other unduly complicated additional moving parts, and regulation of the engine to suit the load may be accomplished by regulating the amount of fuel supplied, leaving the amount of air introduced substantially constant at all loads.

In the illustrated form of the invention the gas is supplied from any suitable source under moderate pressure, through a pipe 17, to a housing denoted generally by numeral 18, which is clamped to one side of the housing 4; the housing 18 has interior fuel conducting passageways 19 and 20 (Fig. 2), communication between which is controlled by a valve 21 urged toward closed position by a spring 22 having a stem 23 projecting into the housing 4. The housing 18 is also provided with a fuel conducting passageway 24 leading from the passageway 20 above described to the fuel conducting pipe 16, communication between the passages 20 and 24 being controlled by the valve 25 which is urged toward closed position by a spring 26, and provided with a stem 27 which projects into housing 4.

Thus fuel may flow through pipe 16 into conduit 14 only when both of the valves 21 and 25 are open. In the illustrated form of the invention the auxiliary fuel controlling valve 21 is controlled by the arm 13 on the exhaust valve operating rocker member 11, the right hand end of member 13 as the parts appear in Figs. 1 and 2 carrying a cam plate 28 which moves to engage the valve stem 23 and open the auxiliary valve 21 when rocker arm 11 moves to a position to hold the exhaust valve closed. When rocker member 11 opens the exhaust valve, pressure of plate 28 on valve stem 23 is released, and valve 21 closes.

The auxiliary fuel controlling valve 25 is shown as controlled by the arm 9 which operates the rocker member 6 for the main inlet valve 3, the right hand end of arm 9 as the parts appear in Figs. 1 and 2, having attached thereto a cam plate 29 which engages valve stem 27 to open the auxiliary fuel controlling valve 25, when rocker member 6 tilts to move the main inlet valve 3 to open position. The cam plate 29 is so shaped and positioned that the auxiliary fuel controlling valve 25 opens later than the main inlet valve 3, which latter as previously stated opens before the exhaust valve has closed to admit scavenging air unmixed with fuel to the cylinder during the latter part of the exhaust stroke. Then the auxiliary fuel controlling valve 21 is opened when the exhaust valve closes, and the auxiliary fuel controlling valve 25 being opened at about the same time, a combustible mixture of fuel and air enters through main inlet valve 3 to supercharge the cylinder during the early stages of the compression stroke. As the main inlet valve 3 starts to close, auxiliary fuel valve 25 first closes to shut off the supply of fuel, whereupon a final blast of air passes through conduit 14 just before valve 3 closes to purge conduit 14 of residual fuel before valve 3 closes.

Regulation of the engine may be effected as indicated diagrammatically at the top of Fig. 1, by a throttle valve 30 in fuel pipe 17, having an actuating arm 31 which is controlled by the speed governor 32 to regulate the amount of fuel supplied in accordance with the load. Reference herein to gaseous fuel should be understood as comprehending fixed gases, or vaporized or atomized liquid fuels.

While the invention has been disclosed as carried out by mechanism of the above described specific construction, it should be understood that changes may be made therein without departing from the invention in its broader aspects, within the scope of the appended claims.

I claim:

1. A four cycle internal combustion engine of the class described having inlet and exhaust valves communicating with the combustion chamber, gaseous fuel and air supply conduits leading to said inlet valve, said fuel supply conduit having auxiliary valves connected in series therein to afford the passage of fuel through said fuel conduit to said inlet valve when both of said auxiliary valves are open, and means controlled according to the positions of said inlet and exhaust valves for opening one of said auxiliary fuel valves as said inlet valve is opened and opening another of said auxiliary fuel valves as said exhaust valve is closed.

2. A four cycle internal combustion engine of the class described having inlet and exhaust valves communicating with the combustion chamber, mechanisms respectively actuating said inlet and exhaust valves, fuel and air supply conduits leading to said inlet valve, said fuel supply conduit having auxiliary valves connected in series therein to afford passage of fuel through said fuel conduit to said inlet valve only when both of said auxiliary valves are open, mechanism operated by movement of said inlet valve actuating mechanism for opening one of said auxiliary valves as the inlet valve is opened, and mechanism operated by movement of said exhaust valve actuating mechanism for opening another of said auxiliary fuel valves as said exhaust valve is closed.

3. A four cycle internal combustion engine of the class described having inlet and exhaust valves, rocker arms respectively for actuating said valves, fuel and air supply conduits leading to said inlet valve, and auxiliary fuel controlling valves connected in series in said fuel supply conduit to afford flow of fuel to said inlet valve only when both of said auxiliary valves are open, said auxiliary fuel controlling valves having operating members disposed in the respective paths of travel of said rocker arms to open one of said auxiliary fuel valves after the inlet valve has been opened and open another of said auxiliary fuel valves when said exhaust valve is closed.

4. A four cycle internal combustion engine of the class described having inlet and exhaust valves communicating with the combustion chamber, mechanisms respectively actuating said inlet and exhaust valves, fuel and air supply conduits leading to said inlet valve, auxiliary valve means interposed in said fuel supply conduit to afford passage of fuel through said fuel conduit to said inlet valve only when said auxiliary valve means is open, said auxiliary valve means being in part operated by devices actuated by said inlet valve actuating mechanism and in part operated by devices actuated by said exhaust valve actuation mechanism, thereby to open communication through said auxiliary valve means to said inlet valve only when said inlet valve is open and said exhaust valve is closed.

HEWITT A. GEHRES.

REFERENCES CITED

The following references are of record in the file of this patent:

UNITED STATES PATENTS

| Number | Name | Date |
|---|---|---|
| 1,511,698 | White | Oct. 14, 1924 |
| 1,165,674 | Hvid | Dec. 28, 1915 |
| 1,802,848 | Summers | Apr. 28, 1931 |
| 2,024,929 | Joslyn | Dec. 17, 1935 |

FOREIGN PATENTS

| Number | Country | Date |
|---|---|---|
| 9,719 | England | Apr. 21, 1910 |
| 749,659 | France | July 27, 1932 |

---

Certificate of Correction

Patent No. 2,429,932.     October 28, 1947.

HEWITT A. GEHRES

It is hereby certified that error appears in the printed specification of the above numbered patent requiring correction as follows: Column 4, line 64, claim 1, after the word "valve" insert *only*; and that the said Letters Patent should be read with this correction therein that the same may conform to the record of the case in the Patent Office.

Signed and sealed this 20th day of January, A. D. 1948.

[SEAL]

THOMAS F. MURPHY,
*Assistant Commissioner of Patents.* duits leading to said inlet valve, said fuel supply conduit having auxiliary valves connected in series therein to afford passage of fuel through said fuel conduit to said inlet valve only when both of said auxiliary valves are open, mechanism operated by movement of said inlet valve actuating mechanism for opening one of said auxiliary valves as the inlet valve is opened, and mechanism operated by movement of said exhaust valve actuating mechanism for opening another of said auxiliary fuel valves as said exhaust valve is closed.

3. A four cycle internal combustion engine of the class described having inlet and exhaust valves, rocker arms respectively for actuating said valves, fuel and air supply conduits leading to said inlet valve, and auxiliary fuel controlling valves connected in series in said fuel supply conduit to afford flow of fuel to said inlet valve only when both of said auxiliary valves are open, said auxiliary fuel controlling valves having operating members disposed in the respective paths of travel of said rocker arms to open one of said auxiliary fuel valves after the inlet valve has been opened and open another of said auxiliary fuel valves when said exhaust valve is closed.

4. A four cycle internal combustion engine of the class described having inlet and exhaust valves communicating with the combustion chamber, mechanisms respectively actuating said inlet and exhaust valves, fuel and air supply conduits leading to said inlet valve, auxiliary valve means interposed in said fuel supply conduit to afford passage of fuel through said fuel conduit to said inlet valve only when said auxiliary valve means is open, said auxiliary valve means being in part operated by devices actuated by said inlet valve actuating mechanism and in part operated by devices actuated by said exhaust valve actuation mechanism, thereby to open communication through said auxiliary valve means to said inlet valve only when said inlet valve is open and said exhaust valve is closed.

HEWITT A. GEHRES.

REFERENCES CITED

The following references are of record in the file of this patent:

UNITED STATES PATENTS

| Number | Name | Date |
|---|---|---|
| 1,511,698 | White | Oct. 14, 1924 |
| 1,165,674 | Hvid | Dec. 28, 1915 |
| 1,802,848 | Summers | Apr. 28, 1931 |
| 2,024,929 | Joslyn | Dec. 17, 1935 |

FOREIGN PATENTS

| Number | Country | Date |
|---|---|---|
| 9,719 | England | Apr. 21, 1910 |
| 749,659 | France | July 27, 1932 |

---

Certificate of Correction

Patent No. 2,429,932.     October 28, 1947.

HEWITT A. GEHRES

It is hereby certified that error appears in the printed specification of the above numbered patent requiring correction as follows: Column 4, line 64, claim 1, after the word "valve" insert *only*; and that the said Letters Patent should be read with this correction therein that the same may conform to the record of the case in the Patent Office.

Signed and sealed this 20th day of January, A. D. 1948.

[SEAL]

THOMAS F. MURPHY,
*Assistant Commissioner of Patents.*